W. SIMONSSON.
MEASURING INSTRUMENT.
APPLICATION FILED JUNE 21, 1906. RENEWED SEPT. 22, 1917.

1,271,491.

Patented July 2, 1918.
3 SHEETS—SHEET 2.

W. SIMONSSON.
MEASURING INSTRUMENT.
APPLICATION FILED JUNE 21, 1906. RENEWED SEPT. 22, 1917.

1,271,491.

Patented July 2, 1918.

Witnesses

Inventor
Wilhelm Simonsson
By his Attorney

UNITED STATES PATENT OFFICE.

WILHELM SIMONSSON, OF NEW YORK, N. Y.

MEASURING INSTRUMENT.

1,271,491.   Specification of Letters Patent.   Patented July 2, 1918.

Application filed June 21, 1906, Serial No. 322,709. Renewed September 22, 1917. Serial No. 192,831.

*To all whom it may concern:*

Be it known that I, WILHELM SIMONSSON, a subject of the King of Sweden, residing in the city, county, and State of New York, have invented certain new and useful Improvements in Measuring Instruments, of which the following is a specification.

This invention relates to certain improvements in measuring instruments, and more particularly in that type or class of such devices wherein a counterpoise in the nature of a pendulating weighted lever is adapted by its swinging or rocking movements to counterbalance different loads or weights applied to a load receiving means, and the object of the invention is to provide an instrument of this general character of a simple and comparatively inexpensive nature, and of a strong, compact and durable construction having a novel and improved arrangement of such pendulating devices and connections therefor, whereby greater capacity and increased accuracy, convenience and uniformity of operation is attained.

The invention consists, in part, in a measuring instrument of the pendulum type having a fulcrum part and a pendulating lever supported for rocking movement upon said fulcrum part and weighted at its lower end, and adapted, when rocked during the measuring operation, to traverse said fulcrum part in such a manner that the latter affords a shifting support for said lever.

The invention also consists in a measuring instrument of this general character, wherein the pendulating lever is suspended, and said lever and the fulcrum part are so constructed and arranged that the strain upon the suspending means is not materially increased during the rocking movement of said lever, the lever being supported by the fulcrum part with an efficiency which gradually increases as the load or weight is increased during the measuring operation.

The invention further consists in a measuring instrument of this general character wherein a flexible suspender is provided for retaining the lever in relation to the fulcrum part and said fulcrum part and lever are so arranged and constructed that said lever is supported by said fulcrum part with an efficiency which gradually increases as the strain upon the lever increases during the measuring operation, in order that such flexible suspender may not be subjected to excessive strains.

Another part of the invention consists in a measuring instrument of the pendulum type having a fulcrum part, and a pendulating lever supported for rocking movement upon said fulcrum part and weighted at its lower end and adapted, when rocked during the measuring operation, to traverse said fulcrum part in such a manner that the latter affords a shifting support for the lever, wherein the lever is provided with an arm or extension having a curved surface adapted to be traversed by a flexible connection connected to load receiving means and operable to communicate the influence of the load to the lever without material deviation of said connection from its normal path.

The invention also contemplates certain novel features of the construction, and combinations and arrangements of the several parts of the improved measuring instrument, whereby certain important advantages are attained, and the device is rendered simpler, less expensive, and otherwise better adapted and more convenient for use, all as will be hereinafter fully set forth.

The novel features of the invention will be carefully defined in the claims.

In the accompanying drawings which serve to illustrate my invention—

Fig. 5 is a fragmentary detail view showing a modified arrangement of the means for suspending the pendulating weighted lever.

Figure 1:
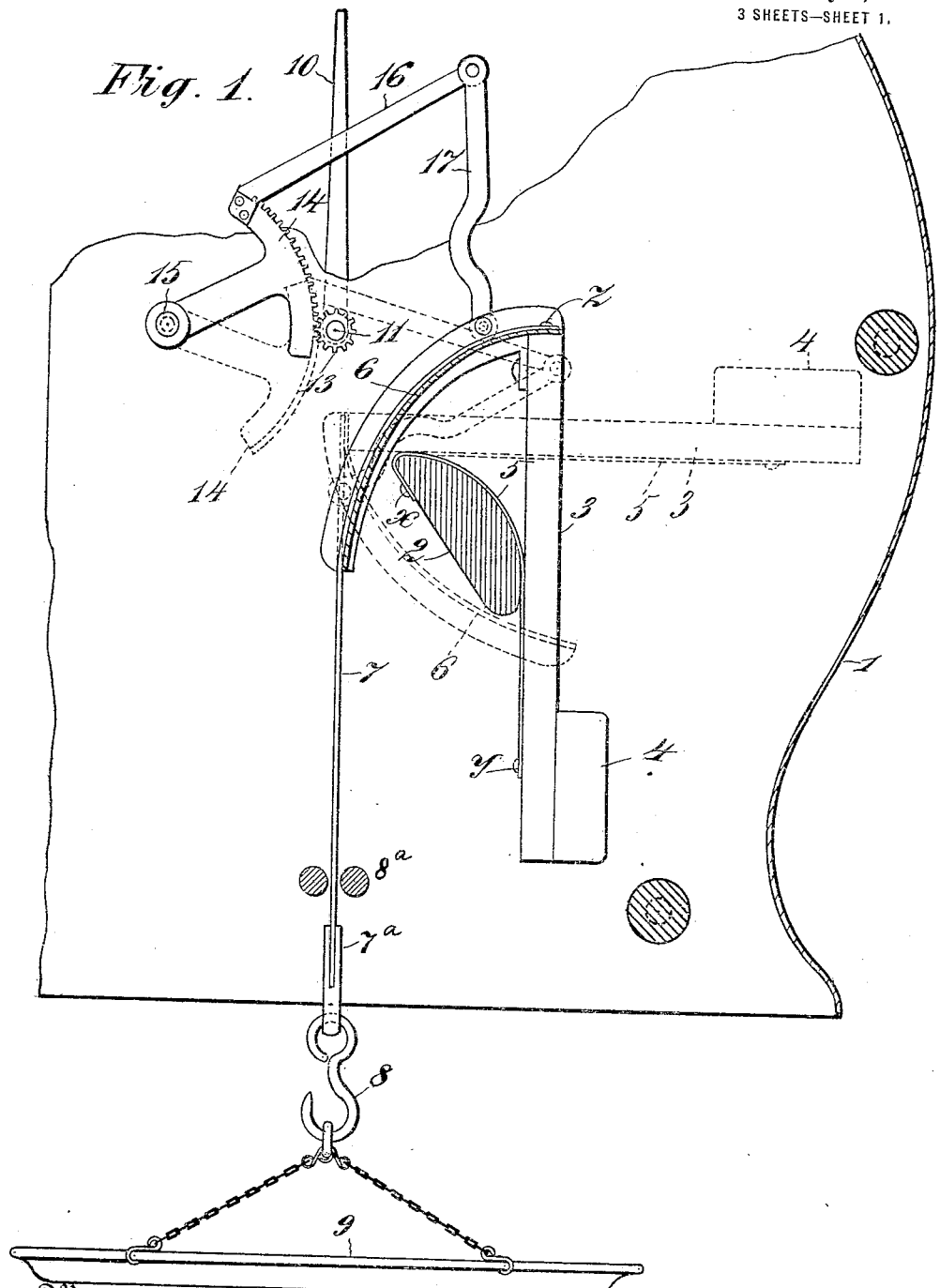
Figure 1 is a sectional view taken vertically through a measuring instrument embodying my improvements in a plane parallel with the direction of movement of the pendulating lever.
Figure 2:
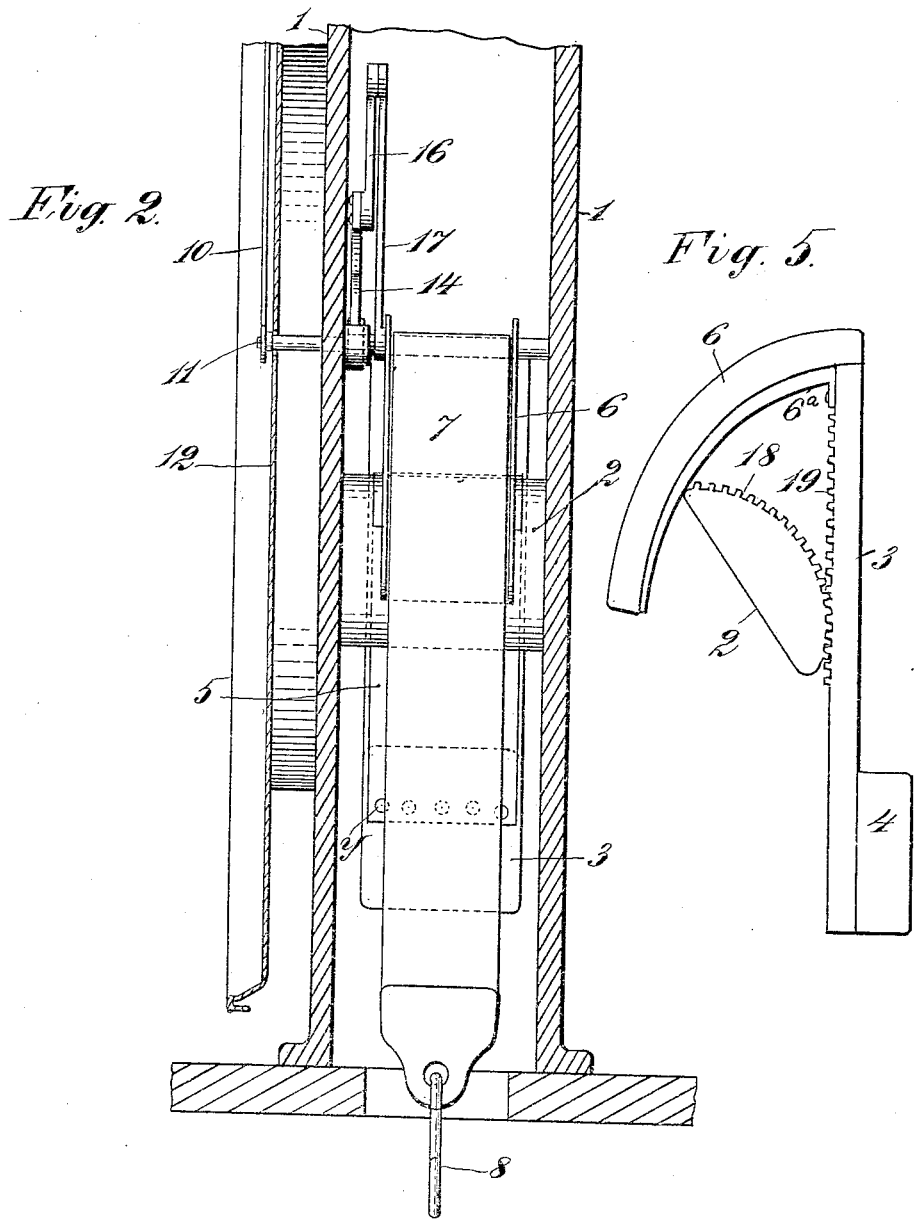
Fig. 2 is a sectional view taken vertically through the casing of the improved measuring instrument in a plane at right angles to the plane of the section in Fig. 1, and showing the operative parts of the device in elevation.
Figure 3:
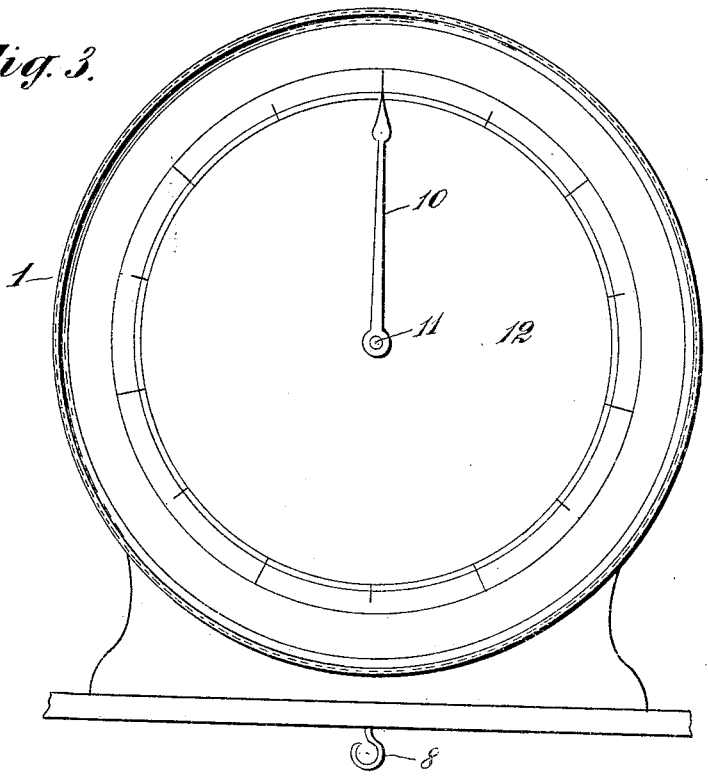
Fig. 3 is a front elevation of the improved measuring instrument.

Referring first to Figs. 1, 2 and 3, wherein I have shown my improvements applied for use to a weighing scale of the pendulum type, 1 represents a frame or casing of any preferred kind, at the central part of which is extended a fulcrum block or member 2, the upper part of which is provided with a rounded or irregularly inclined peripheral bearing surface. 3 represents a pendulating lever, provided at its lower end with a suitable weight 4, and 5 represents a flexible connector, herein shown as a thin strip or ribbon of steel or the like, the upper end portion of which is passed around the convex or rounded peripheral bearing surface of the fulcrum part or block 2, and has connection at its upper extremity with the upper part of said block 2, as shown at $x$ in Fig. 1, while the lower end portion of said flexible strip or connector 5 is pendent below the fulcrum block or member 2 and has connection at its lower extremity with the lower part of the weighted pendulating lever 3, in such a manner that the said pendulating lever is suspended upon the said flexible connector or strip and is permitted to play freely upon the curved or convex surface of the fulcrum block 2.

The upper end of the pendulating weighted lever 3 is provided with a separately formed curved guide plate or member 6, secured in position by means of a screw or the like, as indicated at $6^a$ in the drawings, and which is directed downwardly from the said upper end of lever 3, and is extended laterally therefrom and spaced away from said upper end of said lever 3 in such a manner as to be adapted, when the lever 3 hangs in its normal vertical position as shown in Fig. 1, to take behind the rear face of the fulcrum block or member 2, or that face of said fulcrum block or member which is opposite to the curved or convex surface upon which the lever 3 bears, the parts being so proportioned as to permit free rocking or swinging movement of the lever upon said curved or convex surface of the fulcrum block or member without contact of the laterally extended guide member 6 at the upper end of the lever with the said fulcrum block during the ordinary use of the device in weighing.

7 represents another flexible connector also shown herein as in the form of a thin metal ribbon or strip, the upper end portion of which is lapped loosely upon and extended upwardly along the curved outer or perimetral surface of the laterally extended guide member 6, and is secured thereto by means of a suitable fastening as shown at $z$, at the upper part of said guide member, while the lower end of said connector or strip 7 is extended down below the lower part of the guide member 6 and through the lower part of the casing 1 and carries at its lower extremity an attached thickened integral reinforcement $7^a$ within which the extremity of said thin metal strip is embedded or inclosed in such a manner as to protect the same, and afford a secure connection of said strip with a hook 8 or equivalent means whereby a scale pan 9 may be supported upon said strip or connector 7 in position to receive the articles to be weighed. In the drawings I have shown the lower end of the strip or connector 7 extended for vertical movement between guides at the lower part of the casing in such a manner as to prevent swaying movement of the pan 9.

It will be obvious that the pan 9 may be replaced by other well known means for supporting articles to be weighed, in which case the hook 8 may be omitted and the lower end of the connector or strip 7 may be coupled in any approved way to such supporting means without departure from my invention.

As shown in Fig. 3, the casing 1 is provided with a dial 12 having a circular series of graduations inscribed upon it to represent the units of weight, and the said graduations are adapted to be traversed by an index 10, held upon a shaft 11, extended within the casing adjacent to the fulcrum block or member and provided with a pinion 13, the teeth of which are in mesh with those of a segment rack 14, mounted to swing pivotally as shown at 15, and having at one end a laterally directed arm 16, the extremity of which is coupled with the upper end of a bent link 17, the lower end of which has connection with the lateral curved extension or guide member 6 of the pendulating weighted lever 3.

As herein shown, the parts are so constructed and arranged that in their initial positions, assumed when no weight is applied to the load receiving means, and when the pointer is at zero on the dial, the link 17 which affords connection between the pendulum or lever 3 and the rack for actuating said pointer, is extended substantially parallel with or in the direction of the length of said lever or pendulum, so that at the commencement of the movement of said lever, a comparatively small extent of endwise displacement of said link occurs, which gradually increases as the angular movement of the lever increases, so as to compensate for non-uniform movement of the lever and compel substantially uniform travel of the pointer over the graduations of the dial under equal increments of the load, and permit substantially equal spacing of the dial graduations.

By this construction, when an article to be weighed is rested upon the pan 9, a certain draft will be exerted upon the flexible pendent connector 7, operating to draw the same downwardly within the casing, and owing to the connection of the upper extremity of said connector with the curved extension or guide member 6 of the pendulating lever, the said downward movement of said connector or strip 7 will be communicated to said guide member 6 in such a manner as to rock the lever 3 upon the curved or convex surface of the fulcrum block or member 2 and elevate the weighted lower end of said pendulating lever to an extent commensurate with the weight of such article to be weighed.

The rocking or swinging movement thus communicated to the pendulating lever 3 is communicated through the link 17 and arm 16 to the segment rack 14 in such a manner as to rock the same pivotally upon its axis at 15, whereby a certain degree of rotatory movement is imparted to pinion 13 and shaft 11 carrying the same to cause the index 10 to traverse the graduations of the dial 12 and indicate the weight of the article thereon.

Upon the removal of the article from the pan 9, the weighted lower end of the pendulating lever 3 will serve to return the lever 3 and index mechanism to their normal vertical positions, ready for the succeeding weighing operation, as will be readily understood.

Owing to the curvature of the surface of the fulcrum block or member 2 whereon the lever 3 bears, it will be seen that said surface will afford a fulcrum constantly shifting throughout the movement of the lever, and since it is desirable in order to avoid vibration of the index, that the pan 9 should move vertically with as little lateral or swaying movement as possible, I impart to the surface of the extension or guide member 6 whereon the connector 7 bears a cycloidal curvature of such a nature that the said connector 7 is maintained accurately in vertical position during its movement, despite the shifting of the fulcrum during the rocking or swinging movement of the lever.

I have also shown the lower part of the casing provided with closely adjacent rounded parts or members 8ª, 8ª between which the draft band or connector 7 is adapted to play in such a manner that said spaced parts of members afford an effective means for limiting or preventing lateral or swaying movement of said band or connector such as might improperly affect the operation of the mechanism.

Figure 4:
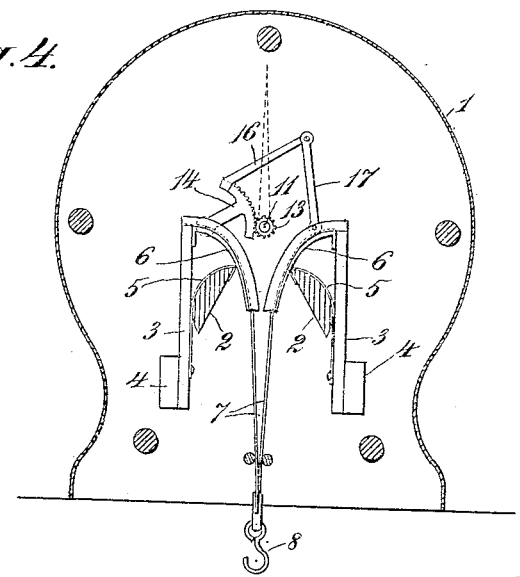
Fig. 4 is a view somewhat similar to Fig. 1, but drawn to a smaller scale, and showing a modified arrangement of the operative devices of the improved instrument, and—

In Fig. 4 I have shown a construction of the improved weighing scale wherein the pendulating levers and fulcra therefor, together with the connectors 5 and 7 are duplicated so as to be capable of simultaneous operation from a single pan or other supporting means with which both connectors 7, 7 are coupled and to indicate the weight through the medium of an index mechanism similar to that above described. This structure is to be preferred in certain cases where scales of large capacity are desired.

In Fig. 5 I have shown a structure wherein the connector 5 is dispensed with and is replaced by a modified formation of suspending means comprising teeth produced in the lever 3 and engaged with corresponding teeth produced upon the curved or convex surface of the fulcrum block as shown at 18. The teeth 19 upon the lever are adapted, in the rocking or swinging movement thereof, to mesh with the teeth 18 of the fulcrum block or member in such a manner as to compel a gradual shifting of the fulcrum of said lever.

By reason of the pendent and substantially vertical position assumed by the weighted lever member when in its inactive position, it will be seen that said lever is capable of being moved or swung, during the operation of the improved measuring instrument, through an arc of comparatively great amplitude, much greater, in fact, than would be possible were said lever member horizontally positioned or balanced upon the fulcrum or supporting member during such inactive position, and in this way a materially increased capacity is imparted to the improved measuring instrument constructed according to my invention, without material increase in the size or weight of the mechanism.

Furthermore, the structure and arrangement of the parts above set forth is also such that the shifting engagement afforded between the pendulating weighted lever member and the irregularly inclined surface of the supporting or fulcrum member, during the use of the improved measuring instrument, insures the support of the lever member upon such supporting or fulcrum member with an efficiency which varies and gradually increases as the strain imposed upon the lever member is increased by increases of the load during the measuring operation, it being evident that the lever member, when moved upwardly along the inclined surface of the fulcrum member to a substantially horizontal position by the imposition of a comparatively great load upon the load receiving means, is supported upon said fulcrum or supporting member with much greater efficiency than when moved or swung to a lesser extent, such as will cause said lever member to stand in a downwardly inclined position, by the application of a lesser load to the load receiving means or pan 9.

In this way a great part of the strain which would otherwise be imposed upon the flexible suspenders or equivalent suspending means for the lever member is removed therefrom, so that the liability of stretching or breakage of the suspending means is avoided. In fact, if desired, the surface of the inclined or rounded supporting or fulcrum member 2 may be so proportioned as to insure a substantially constant strain upon the suspending means throughout the operation of the instrument, irrespective of the load applied to the load receiving means.

From the above description of my improvements it will be obvious that the measuring instrument constructed according to my invention is of an extremely simple and comparatively inexpensive nature and is particularly well adapted for use by reason of the accuracy and uniformity of its operation, and it will also be obvious from the above description that the device is susceptible of considerable modification without material departure from the principles and spirit of the invention, and for this reason I do not desire to be understood as limiting myself to the precise formation and arrangement of the several parts of the device as herein set forth in carrying out my invention in practice.

Having thus described my invention, what I claim and desire to secure by Letters Patent is:—

1. A measuring instrument having a frame, two convex fulcrum blocks mounted therein, two levers mounted to rock on the respective fulcrum blocks, means for effecting a positive rolling of said levers along said fulcrum blocks during rocking movement of the levers, weights on the outer ends of the respective levers, curved guide plates on the inner ends of the respective levers, index mechanism operatively connected with said levers, load receiving means, and flexible connections operatively connected with such load receiving means and having portions passed around and connected with the curved guide plates of the respective levers to communicate movement thereto.

2. A measuring instrument having a fulcrum block, a pendulating lever adapted to traverse said fulcrum block, a weight at the lower part of said lever, means for compelling rolling movement of the lever along the fulcrum block when said lever is rocked, a curved extension laterally directed from the upper part of said lever, index mechanism operatively connected with the lever, load receiving means, and a flexible connector operatively connected with such load receiving means and having its upper part extended along the curved surface of said extension and connected therewith to impart movement to said lever.

3. A measuring instrument having a frame, two convex fulcrum blocks mounted in said frame, two levers mounted to rock on the respective fulcrum blocks, means for effecting a positive rolling of said levers on said blocks without slipping, weights on the outer ends of the respective levers, curved guide plates on the inner ends of said levers, straps fixed to and bearing on the respective guide plates and secured together at their pendent ends, load receiving means attached to the pendent ends of said strips, and index means actuated from the levers.

4. A measuring instrument having a fulcrum block, a pendulating lever adapted, when rocked, to traverse said fulcrum block, a weight at the lower part of said lever, means for compelling rolling movement of the lever along the fulcrum block when the lever is rocked, a curved extension laterally directed from the upper part of said lever and having its lower part spaced away from the lever and adapted, when the lever is rocked, to play along the side of the fulcrum block opposite to the surface at which the lever is arranged, index mechanism operatively connected with the lever, load receiving means, and a flexible connector operatively connected with said load receiving means and having its upper part extended along the curved surface of said extension and connected therewith to impart movement to said lever.

5. A measuring instrument having a fulcrum block, a pendulating lever adapted to traverse said fulcrum block, a weight at the lower part of said lever, means for compelling rolling movement of the lever along the fulcrum block when the lever is rocked, an extension laterally directed from the upper part of said lever, and having a perimetral surface conforming to a cycloidal curve, index mechanism operatively connected with said lever, load receiving means, and a device extended from the supporting means to the said extension of the lever to communicate movement to the latter and adapted to traverse the cycloidal curved surface of said extension.

6. A measuring instrument having a fulcrum block, a pendulating lever adapted to traverse said fulcrum block, a weight at the lower part of the lever, means for compelling rolling movement of the lever along the fulcrum block when the lever is rocked, an extension laterally directed from the upper part of said lever and having a perimetral surface conforming to a cycloidal curve, index mechanism operatively connected with the lever, load receiving means and a flexible connector operatively connected with the load receiving means and said extension of the lever to communicate movement to the latter, and having a part lapped upon said cycloidal curved surface of the extension and adapted to be withdrawn therefrom when the lever is rocked.

7. A measuring instrument having a fulcrum block having a curved surface, a pendulating lever adapted to traverse said curved surface of the fulcrum block when the lever is rocked, a weight at the lower part of the lever, a flexible connector the upper end of which has connection with the fulcrum block and is extended around the curved surface thereof and the lower end of which has connection with the weighted lever to support the same for rolling movement upon the fulcrum block, a curved extension laterally directed from the upper part of said lever and having its lower part spaced away from the lever and adapted, when the lever is rocked, to play along the side of the fulcrum block opposite to the surface at which the lever is engaged, index mechanism operatively connected with the lever, load receiving means, and a flexible connector operatively connected with said load receiving means and having its upper part extended along the curved surface of said extension and connected therewith to impart movement to said lever.

8. A measuring instrument having a fulcrum block, having a curved surface, a pendulating lever adapted to traverse said curved surface of the fulcrum block when the lever is rocked, a weight at the lower part of the lever, a flexible connector the upper end of which has connection with the fulcrum block and is extended around the curved surface thereof and the lower end of which has connection with the weighted lever to support the same for rolling movement upon the fulcrum block, an extension laterally directed from the upper part of said lever and having a perimetral surface conforming to a cycloidal curve, index mechanism operatively connected with the lever, load receiving means, and a device extended from the supporting means to the said extension of the lever to communicate movement to the latter and having a portion adapted to traverse the cycloidal curved surface of said extension.

9. A measuring instrument having a fulcrum block having a curved surface, a pendulating lever adapted to traverse said curved surface of the fulcrum block when the lever is rocked, a weight at the lower part of the lever, a flexible connector the upper end of which has connection with the fulcrum block and is extended around the curved surface thereof and the lower end of which has connection with the weighted lever to support the same for rolling movement upon the fulcrum block, an extension laterally directed from the upper part of said lever and having a perimetral surface conforming to a cycloidal curve, index mechanism operatively connected with the lever, load receiving means, and a flexible connector operatively connected with the load receiving means and said extension of the lever to communicate movement to the latter and having a part lapped upon said cycloidal curved surface of the extension and adapted to be withdrawn therefrom when the lever is rocked.

10. A measuring instrument having a pendulating lever weighted at its lower part and capable of rocking movement during the measuring operation, a flexible suspender affording support for the lever, and means, including a part whereon the lever has shifting contact during its rocking movement to vary the leverage exerted thereby, capable of operation to support the lever with varying efficiency during rocking movement thereof.

11. A measuring instrument having a pendulating lever weighted at its lower part and capable of rocking movement during the measuring operation, a flexible suspender affording support for said lever, and means, including a part whereon the lever has shifting contact during its rocking movement to vary the leverage exerted thereby, capable of operation to support the lever with an efficiency which increases with the increase of the strain imposed upon the lever during the measuring operation.

12. A measuring instrument having a pendulating lever weighted at its lower part and capable of pivotal movement away from and toward its pendent position during the measuring operation, a fulcrum member having a surface whereon said lever is adapted for rolling contact during its pivotal movement to vary the leverage exerted thereby, said surface of the fulcrum member being irregularly inclined and operable to support the lever with an efficiency which varies during the pivotal movement of said lever, and means capable of operation to compel rolling movement of the lever along said inclined surface of the fulcrum member when the lever is moved pivotally.

13. A measuring instrument having a pendulating lever weighted at its lower part and capable of pivotal movement away from and toward its pendent position during the measuring operation, a fulcrum member having a surface whereon said lever is adapted for rolling contact during its pivotal movement to vary the leverage exerted thereby, said surface of the fulcrum member being irregularly inclined and operable to support the lever with an efficiency which increases during the progress of the pivotal movement of said lever when the strain upon the lever is increased, and means capable of operation to compel rolling movement of said lever along said inclined surface of the fulcrum member when the lever is moved pivotally.

14. A measuring instrument having a pendulating lever weighted at its lower part and capable of rocking movement during the measuring operation, a flexible suspender affording support for said lever, and a fulcrum member having an irregularly inclined surface whereon the lever has shifting contact during its rocking movement to vary the leverage exerted thereby, and whereon the lever is supported with an efficiency which increases with the increase of the strain imposed upon the lever during the measuring operation.

15. A measuring instrument having a pendulating lever weighted at its lower part and capable of rocking movement during the measuring operation, a flexible suspender affording support for said lever, and a fulcrum member having an irregularly inclined surface whereon said lever has shifting contact during its rocking movement to vary the leverage exerted thereby, and whereon the lever is supported with a supporting effect varying with the rocking movement of the lever during the measuring operation.

16. A measuring instrument having two members, one of which is a pendulating lever weighted at its lower part and capable of rocking movement during the measuring operation, and the other of which is a fulcrum member having an irregularly inclined surface whereon said lever has shifting contact during its rocking movement to vary the leverage exerted thereby, and whereon the lever is supported with an efficiency which varies with the rocking movement of the lever during the measuring operation, and a flexible suspender affording connection between said members.

17. A measuring instrument having two members, one of which is a pendulating lever weighted at its lower part and capable of rocking movement during the measuring operation, and the other of which is a fulcrum member having an irregularly inclined surface whereon said lever has shifting contact during its rocking movement to vary the leverage exerted thereby, and whereon the lever is supported with an efficiency which increases with the increase of the strain imposed upon the lever during the measuring operation, and a flexible suspender affording connection between said members.

18. A measuring instrument having a pendulating lever weighted at its lower part and capable of rocking movement away from and toward its pendent position during the measuring operation, a fulcrum member having a surface whereon said lever is adapted for rolling contact during its rocking movement to vary the leverage exerted thereby, and a flexible suspender affording support for the lever during its rocking movement.

19. A measuring instrument having a pendulating lever weighted at its lower part and capable of rocking movement away from and toward its pendent position during the measuring operation, a fulcrum member having a surface whereon said lever is adapted for shifting contact during its rocking movement to vary the leverage exerted thereby, an extension laterally directed from said lever, and means affording connection between said extension and a load support operable to transmit rocking movement to said lever.

20. A measuring instrument having a pendulating lever weighted at its lower part and capable of rocking movement away from and toward its pendent position during the measuring operation, a fulcrum member having a surface whereon said lever is adapted for shifting contact during its rocking movement to vary the leverage exerted thereby, a flexible suspender affording support for the lever during its rocking movement, an extension laterally directed from the lever, and means affording connection between said extension and a load support operable to transmit rocking movement to said lever.

21. A measuring instrument having a pendulating lever weighted at its lower part, fulcrum means whereby the lever is supported for pivotal movement away from and toward its pendent position during the measuring operation, an endwise movable draft device adapted for connection with a load support, a member for communicating movement from the draft device to said lever having a part coöperatively engaged with the draft device and traversing a path substantially parallel with the movement thereof when actuated from the load support, and means engageable with said draft device to lessen lateral play of said draft device during its endwise movement.

In witness whereof I have hereunto signed my name this 19th day of June, 1906, in the presence of two subscribing witnesses.

WILHELM SIMONSSON.

Witnesses:
 HENRY CONNETT,
 WILLIAM J. FIRTH.

Copies of this patent may be obtained for five cents each, by addressing the "Commissioner of Patents, Washington, D. C."